Sept. 3, 1929.  W. W. HUGHES  1,726,957
HIGH PRESSURE HOSE
Filed May 7, 1928
Fig. 1.
Fig. 2.
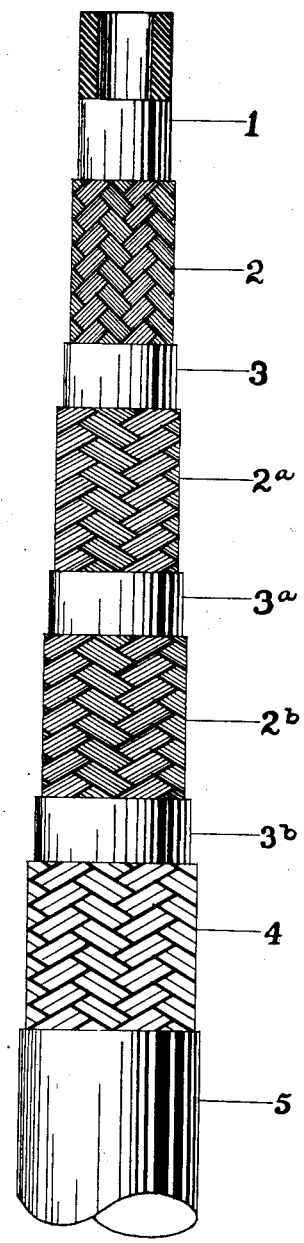
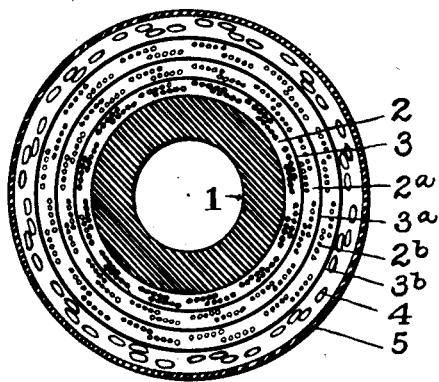
INVENTOR
William W. Hughes
BY
ATTORNEY Patented Sept. 3, 1929.

1,726,957

UNITED STATES PATENT OFFICE.

WILLIAM W. HUGHES, OF RUTHERFORD, NEW JERSEY, ASSIGNOR TO NEW YORK BELTING & PACKING COMPANY, OF PASSAIC, NEW JERSEY, A CORPORATION OF NEW YORK.

HIGH-PRESSURE HOSE.

Application filed May 7, 1928. Serial No. 275,626.

This invention relates to a flexible hose for conducting fluids under high pressures with little or no increase in length or volume of the hose.

The hose herein disclosed is an improvement over that of my application Serial No. 190,193, filed May 10, 1927.

Without intending to limit the scope more than is required by the state of the prior art, my invention comprises essentially a hose composed of a plurality of sheaths of braided wire surrounding an inner fluid conducting tube, the wire being wound under tension and the pitch of braid being different in different wire sheaths.

For a detailed description of the invention, reference is made to the drawings, in which:

Fig. 1 shows an elevation of the preferred form of the invention; and

Fig. 2 shows a section through the hose of my invention.

The hose of my invention comprises an inner tube 1 of a grease proof compound about $\frac{1}{16}''$ thick, which serves to conduct the fluid under pressure.

Surrounding the tube 1 is a woven or braided wire sheath 2 in which the wires are composed of several strands, in this case 5, of 012 in. bright steel wire having a breaking strength of fifteen pounds per strand. The wire is braided under a tension of ten pounds per five strands.

Surrounding the wire sheath 2 is a thin layer of rubber 3 about which is the wire sheath $2^a$. The thin rubber tube 3 serves as a cushion between the wire sheaths 2 and $2^a$, thereby adding to the flexibility of the hose. The sheath $2^a$ is similar to the sheath 2 in all respects except that the pitch of braiding used in the sheath $2^a$ is different from that employed in sheath 2, as may be readily seen from the drawings.

Surrounding the sheath $2^a$ are, in succession, a thin rubber tube $3^a$, braided wire sheath $2^b$, thin rubber tube $3^b$, woven fabric 4, and rubber cover 5.

The thin rubber sheaths $3^a$ and $3^b$ are like tube 3 in all respects and are employed to add to the flexibility of the hose. Sheath $2^b$ is like sheath $2^a$.

The sheath of cotton fabric 4 and the covering 5 of a 22-gauge, grease resisting rubber compound, serve as a protective covering for the hose.

In the form shown in the drawings, the pitch of the wire sheath 2 with respect to the axis of the tube is approximately 45°, and that of wire sheaths $2^a$ and $2^b$ is approximately 55°. While the sheaths $2^a$ and $2^b$ are shown to have the same pitch of braid, yet different pitches of braid may be used in these two sheaths and the degree of pitch may be varied somewhat in all of the wire sheaths.

Due to the pitch of braid used in the braided wire sheath 2, this sheath tends to cause the hose to contract under the action of a high pressure, while due to the pitch of the braid of sheaths $2^a$ and $2^b$, these sheaths tend to cause the hose to elongate under the action of pressure. The result of these opposing tendencies causes the hose to contract slightly under a high pressure, the contraction being almost negligible. The tension under which the braided wire sheaths are wound prevents the hose from expanding and also tends to lessen the amount in change of length.

As a result of the peculiar construction of my hose, it has been found that the hose will stand a bursting pressure of from 13,000 to 14,000 lbs. per sq. in. that in conducting fluid under 10,000 lbs. pressure a 7 ft. length contracted only 2 in., and that when conducting fluid under 2,000 lbs. pressure, a 7 ft. length contracted only 1 in. These tests were made upon a hose having an interior diameter of $\frac{7}{32}$ in.

Due to the ability of my hose to conduct fluid under high pressure with little change in volume, and also due to its flexibility, this hose is admirably adapted to be used in hydraulic brake systems and in lubricating systems of the high pressure type.

While the preferred embodiment of the invention has been specifically described herein, the invention is not limited thereto but comprehends variations thereof such as would readily occur to anyone skilled in the art, for instance, the size and material of the fluid conducting tube may be varied, the number of sheaths of braided wire may be varied, the pitch of braid may be varied, the size and/or material of the wire may be changed, the type of protective covering may be altered, and many other changes made without deviating from the scope of the invention.

For an understanding of the scope of my invention, reference is made to the claims which follow.

Having thus described my invention, what I claim and desire to protect by Letters Patent is:

1. A flexible hose for transmitting high pressures without substantial expansion or variation in length comprising, a fluid conducting tube, a plurality of sheaths of braided wire thereabout, the pitch of the braid being different in different sheaths, and the wire being under tension, and thin layers of rubber between the braided wire sheaths.

2. A flexible hose for transmitting high pressures without substantial expansion or variation in length comprising, a fluid conducting tube, a plurality of sheaths of braided wire thereabout, the pitch of the braid being different in different sheaths, and the wire being under tension, thin layers of rubber between the braided wire sheaths, and a sheath of woven fabric and of rubber encasing the wire sheaths.

3. A flexible hose for transmitting high pressures without substantial expansion or variation in length comprising, a fluid conducting tube, a sheath of wire braided at a pitch of approximately 45° thereabout, and a sheath of wire braided at a pitch of approximately 55° surrounding the first wire sheath and a thin layer of rubber between the wire sheaths.

4. A flexible hose for transmitting high pressures without substantial expansion or variation in length comprising, a fluid conducting tube, a sheath of wire braided at a pitch of approximately 45° thereabout, and a sheath of wire braided at a pitch of approximately 55° surrounding the first wire sheath, the wire being under tension and a thin layer of rubber between the wire sheaths.

5. A flexible hose for transmitting high pressures without substantial expansion or variation in length comprising, a fluid conducting tube, a sheath of wire braided at a pitch of approximately 45° thereabout, and a sheath of wire braided at a pitch of approximately 55° surrounding the first wire sheath, the wire being under tension, and a thin layer of rubber between the wire sheath and a protective sheath of woven fabric and a rubber surrounding the wire sheaths.

Signed at Passaic, county of Passaic, State of New Jersey, this 3rd day of May, 1928.

WILLIAM W. HUGHES.